United States Patent
Al-Mahdawi

(10) Patent No.: US 7,526,266 B2
(45) Date of Patent: Apr. 28, 2009

(54) ADAPTIVE COHERENT RFID READER CARRIER CANCELLATION

(75) Inventor: Tareef Ibrahim Al-Mahdawi, San Jose, CA (US)

(73) Assignee: Intelleflex Corporation, San Jose, CA (US)

( * ) Notice: Subject to any disclaimer, the term of this patent is extended or adjusted under 35 U.S.C. 154(b) by 468 days.

(21) Appl. No.: 11/098,881

(22) Filed: Apr. 4, 2005

(65) Prior Publication Data

US 2006/0183454 A1      Aug. 17, 2006

Related U.S. Application Data

(60) Provisional application No. 60/652,681, filed on Feb. 14, 2005.

(51) Int. Cl.
*H04B 1/10* (2006.01)
(52) U.S. Cl. .................................. 455/296; 375/346
(58) Field of Classification Search .............. None
See application file for complete search history.

(56) References Cited

U.S. PATENT DOCUMENTS

| | | | |
|---|---|---|---|
| 5,305,008 A | 4/1994 | Turner et al. | 342/44 |
| 5,952,922 A | 9/1999 | Shober | 340/572.4 |
| 5,974,301 A | 10/1999 | Palmer et al. | 455/63 |
| 6,046,683 A | 4/2000 | Pidwerbetsky et al. | 340/825.54 |
| 6,084,530 A | 7/2000 | Pidwerbetsky et al. | 340/825.54 |
| 6,205,183 B1 | 3/2001 | Dent | 375/261 |
| 6,459,889 B1 | 10/2002 | Ruelke | 455/296 |
| 6,529,568 B1 | 3/2003 | Richards et al. | 375/346 |
| 6,603,391 B1 | 8/2003 | Greeff et al. | 340/10.3 |
| 6,686,830 B1 | 2/2004 | Schirtzer | 340/10.2 |
| 6,801,581 B1 | 10/2004 | Francos et al. | 375/296 |
| 7,133,471 B2* | 11/2006 | Feher | 375/340 |
| 2002/0061080 A1 | 5/2002 | Richards et al. | 375/346 |
| 2002/0061081 A1 | 5/2002 | Richards et al. | 375/346 |
| 2002/0072344 A1 | 6/2002 | Souissi | 455/296 |
| 2003/0021367 A1 | 1/2003 | Smith | 375/346 |
| 2004/0027240 A1 | 2/2004 | Greeff et al. | 340/10.3 |
| 2004/0203478 A1 | 10/2004 | Scott | 455/70 |
| 2004/0246100 A1 | 12/2004 | Kranz | 340/10.1 |
| 2006/0098765 A1* | 5/2006 | Thomas et al. | 375/346 |

OTHER PUBLICATIONS

International Preliminary Examination Report from PCT Application No. PCT/US06/01374 mailed Oct. 14, 2008.

* cited by examiner

*Primary Examiner*—Thanh C Le
(74) *Attorney, Agent, or Firm*—Zilka-Kotab, PC

(57) ABSTRACT

Systems and methods for adaptive cancellation of carrier content includes receiving a signal, adaptively detecting an amount of carrier content in the received signal, generating a feedback signal for canceling out the carrier content in the incoming signal, and introducing the feedback signal for canceling out a majority of carrier content in the signal being received.

21 Claims, 4 Drawing Sheets

ADAPTIVE COHERENT RFID READER CARRIER CANCELLATION

RELATED APPLICATIONS

This application claims priority from U.S. Provisional Patent Application No. 60/652,681, filed Feb. 14, 2005.

FIELD OF THE INVENTION

The present invention relates to RFID circuitry, and more particularly, this invention relates to implementation of circuitry on an RFID reader.

BACKGROUND OF THE INVENTION

RFID technology employs a radio frequency ("RF") wireless link and ultra-small embedded computer circuitry. RFID technology allows physical objects to be identified and tracked via these wireless "tags". It functions like a bar code that communicates to the reader automatically without requiring manual line-of-sight scanning or singulation of the objects. RFID promises to radically transform the retail, pharmaceutical, military, and transportation industries.

Several advantages of RFID technology are summarized in Table 1:

TABLE 1

| Identification without visual contact |
| --- |
| Able to read/write |
| Able to store information in tag |
| Information can be renewed anytime |
| Unique item identification |
| Can withstand harsh environment |
| Reusable |
| High Flexibility/Value |

As shown in FIG. 1, a basic RFID system 100 includes a tag 102, a reader 104, and an optional server 106. The tag 102 includes an integrated circuit (IC) chip and an antenna. The IC chip includes a digital decoder needed to execute the computer commands the tag 102 receives from the tag reader 104. The IC chip also includes a power supply circuit to extract and regulate power from the RF reader; a detector to decode signals from the reader; a back-scattering modulator to send data back to the reader; anti-collision protocol circuits; and at least enough EEPROM memory to store its EPC code.

Communication begins with a reader 104 sending out signals to find the tag 102. When the radio wave hits the tag 102 and the tag 102 recognizes the reader's signal, the reader 104 decodes the data programmed into the tag 102. The information can then be passed to a server 106 for processing. By tagging a variety of items, information about the nature and location of goods can be known instantly and automatically.

The system uses reflected or "backscattered" radio frequency (RF) waves to transmit information from the tag 102 to the reader 104. Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, maximum range ~3 m)
Class-2
Memory tags (8 bits to 128 Mbits programmable at maximum ~3 m range)
Security & privacy protection
Class-3
Battery tags (256 bits to 64 Kb)
Self-Powered Backscatter (internal clock, sensor interface support)
~100 meter range
Class-4
Active tags
Active transmission (permits tag-speaks-first operating modes)
Up to 30,000 meter range In RFID systems where passive receivers (i.e., Class-1 tags) are able to capture enough energy from the transmitted RF to power the device, no batteries are necessary. In systems where distance prevents powering a device in this manner, an alternative power source must be used. For these "alternate" systems (also known as active or semi-passive), batteries are the most common form of power. This greatly increases read range, and the reliability of tag reads, because the tag doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

Fundamentally, the way a class 3 tag works, the reader sends out a carrier signal, typically at 900 MHz, and to communicate with the tag, it amplitude modulates the carrier. In order for the tag to communicate with the reader, the reader stops modulating, and the tag changes its reflectivity in order to communicate with the reader. This is called backscatter. One problem is that the reader cannot send out a perfect tone. The tone warbles, and this is known as phase noise. This noise gets confused with the signals coming back from the tag.

Another problem is that much of the signal received by the reader is not from the tag. The tag signal is very small compared to all of the potential signals found in the vicinity of the reader. Further, some of the reader-emitted carrier signal is found in the input to the reader. For instance, metal objects in the room reflect back carrier signal. Compounding the problem is that the carrier signal reflected from unwanted objects is variable. For instance, moving objects such as a forklift will cause the signal to vary due to the way the inherent change in reflectivity from a moving object. The signal will also vary when the reader is mounted on a moving platform. Thus, merely tuning the reader to optimize the signal for a particular environment is not enough. The variable nature of the carrier signal must be dealt with in order to effectively extract the tag signal from the noise created by other objects in the environment.

Thus, it is widely recognized that removing or canceling out as much of the reader's own carrier signal as possible is the key to achieving maximum reader sensitivity and range in backscattering RFID systems. One technique was investigated for subtracting out both the reader carrier wave and its associated phase noise from the return signals that feed into the reader's input. However, this technique only helps reduce cross-coupling in the reader itself and fails to reduce the effect of the massive un-modulated backscatter coming from reflective objects in the field of the reader.

SUMMARY OF THE INVENTION

Accordingly, techniques and systems have been developed to dynamically detect the magnitude of the carrier signal at the input to the reader by monitoring the carrier content from the reader and use this information to not only cancel out a majority of the carrier itself but cancel out most of its associated phase noise as well. Unlike previous approaches, this adaptive "closed loop feedback approach" is not only more effective in removing carrier cross-talk in a reader, but it also removes much of the non-modulated backscatter from all other reflective objects in the field as well.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The present description discloses a circuit that dynamically detects the magnitude of carrier content (e.g., carrier signal and phase noise) at the input to the reader by monitoring the direct current (DC) component in the I/Q nodes of the reader and using this information to subtract out just enough of a replica of the carrier to not only cancel out more of the carrier signal itself but cancel out most of its associated phase noise as well. Unlike previous approaches, this adaptive "closed loop feedback approach" is not only more effective in removing carrier cross-talk in the reader, but it also removes all or nearly all of the non-modulated backscatter from all other reflective objects in the field as well.

An additional benefit of the invention is that it improves the sensitivity of an RFID receiver (reader) by adaptive cancellation of the direct signal from the carrier coupled either directly or reflected by the environment. The cancellation does not significantly affect the modulated back-scattered signal from the RFID tag. The cancellation of the unmodulated carrier signal as described herein results in at least the following advantages.

1—Improved sensitivity because of the removal of the strong signal super-imposed on the back-scattered signal.
2—Cancellation of the carrier phase noise.
3—Improvement in the dynamic range because of the removal of large signal from the front end which carries no information.
4—By canceling carrier content at the front end, the gain of the low noise amplifier (LNA) can be increased, thereby improving the communications link budget by a factor of 10 or more.

Figure 1:
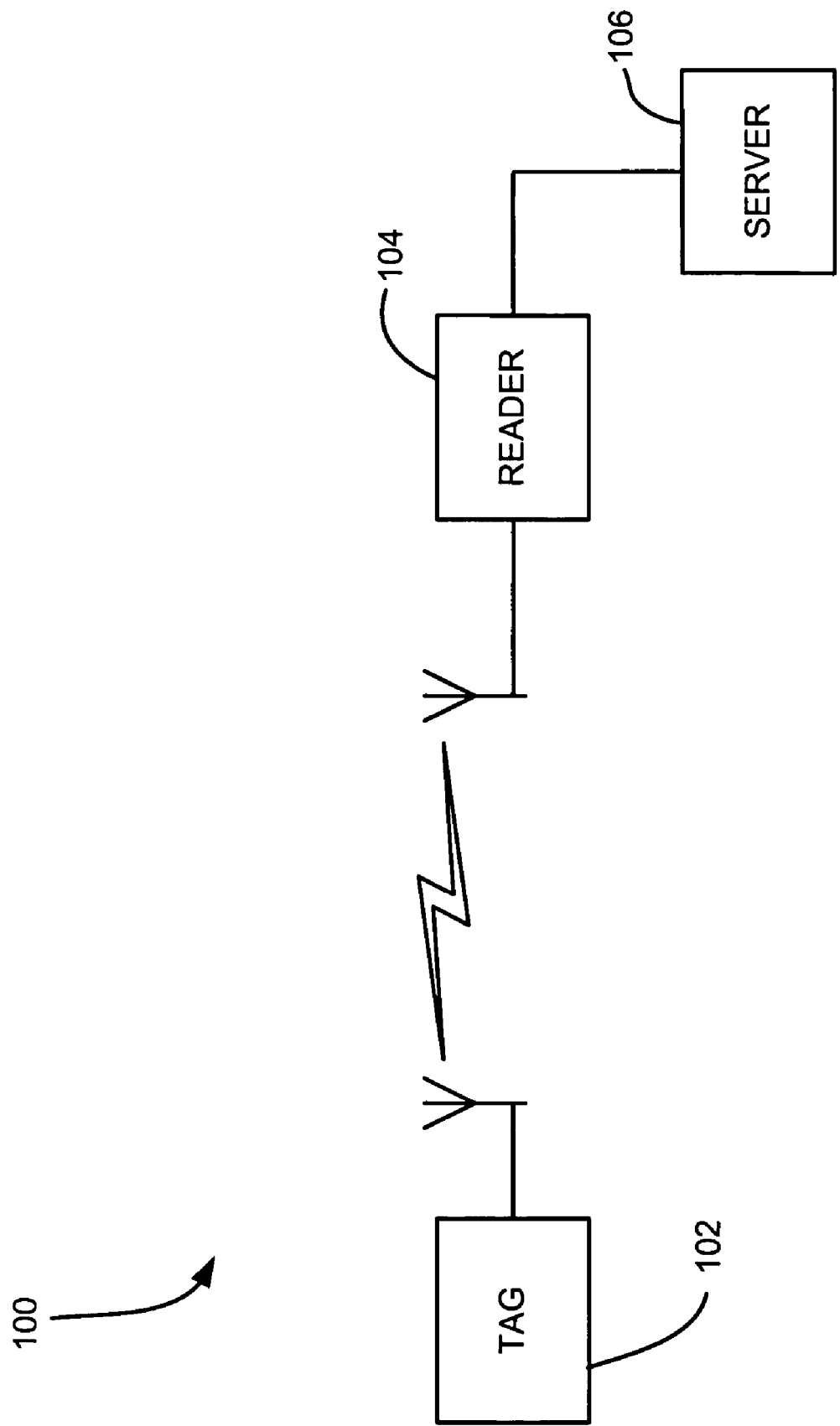
FIG. 1 is a system diagram of an RFID system.
Figure 2:
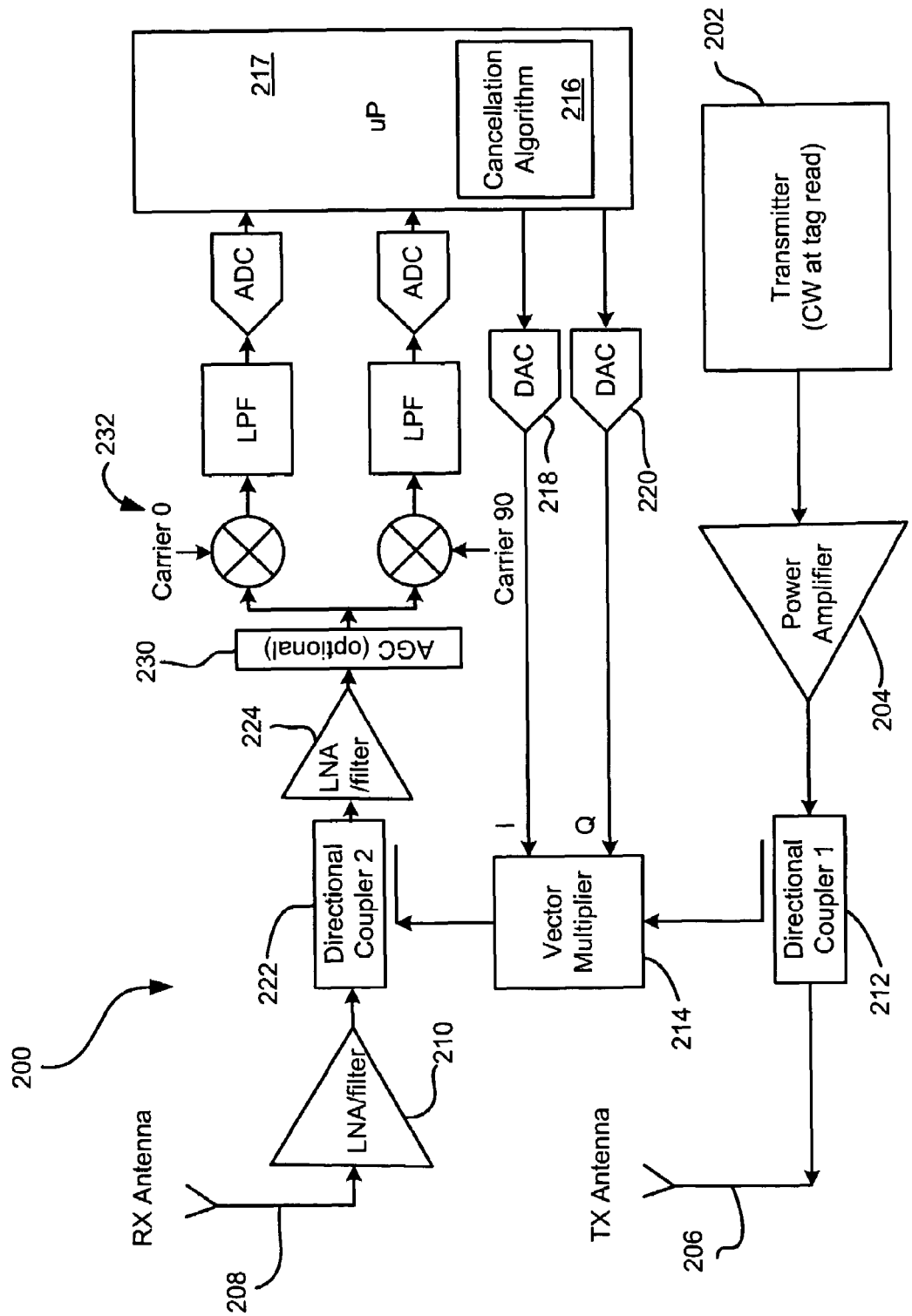
FIG. 2 is a system diagram of one embodiment of the present invention.

FIG. 2 is a diagram of a system 200 for improving the sensitivity of an RFID receiver according to a preferred embodiment. The system is preferably integrated into a reader, but can also be added as a supplemental hardware module in communication with the reader.

As shown in FIG. 2, a transmitter 202 generates a continuous wave (CW), which is amplified by an amplifier 204 before being sent into the environment by a transmitting antenna 206. A receiving antenna 208 and optional LNA and/or filter 210 receive and process and/or enhance returning signals.

A typical carrier signal is about 900 MHz. Typically, the tag signal is sent at an offset due to modulation, e.g., 288 KHz. Thus, the tag signal coming back is not the same as the signal being emitted by the reader. However, as mentioned above, the receiver is literally swamped with unwanted signals, making it difficult to discern the modulations of the incoming tag signal from the multitude of incoming signals.

The detection of the incoming carrier content (as opposed to the desired tag response) is performed by dynamically performing coherent I-Q detection of the received signal and averaging the detected I and Q over a period of time to detect the amount of the coherent carrier content in the received signal. In one embodiment, vectors formed by I and Q, which are references generated within the receiver, provides the amount of the carrier present in the received signal. Now that the level of the carrier present in the signal has been determined based on the DC signal, the carrier noise in the input signal can be cancelled.

A cancellation algorithm 216, such as a known vector minimization algorithm, is executed by a processor 217. Such algorithms are widely available and one skilled in the art will understand and know of suitable algorithms. How the cancellation algorithm functions and is used is presented in more detail below.

The I-Q detector outputs are passed through a low pass filter (LPF) to isolate the slow change of the carrier amplitude and phase. The amplitude and phase shifters are commanded in order to have the same or close amplitude as that of the carrier power into the receiver and the opposite phase such that the carrier power is cancelled out at the front end.

A small portion of the transmitted carrier signal is fed back into the receiver front end (using a coupler 212) via a variable attenuator and variable phase shifter in series (i.e. vector multiplier 214). In one embodiment, the vector multiplier takes a sample from the original transmitted carrier signal and directs it back to the input of the receiver. The sample taken directly from the transmitter is then used to cancel the contents of the received signal corresponding to reflected carrier signal noise by providing an opposite signal.

Figure 3:
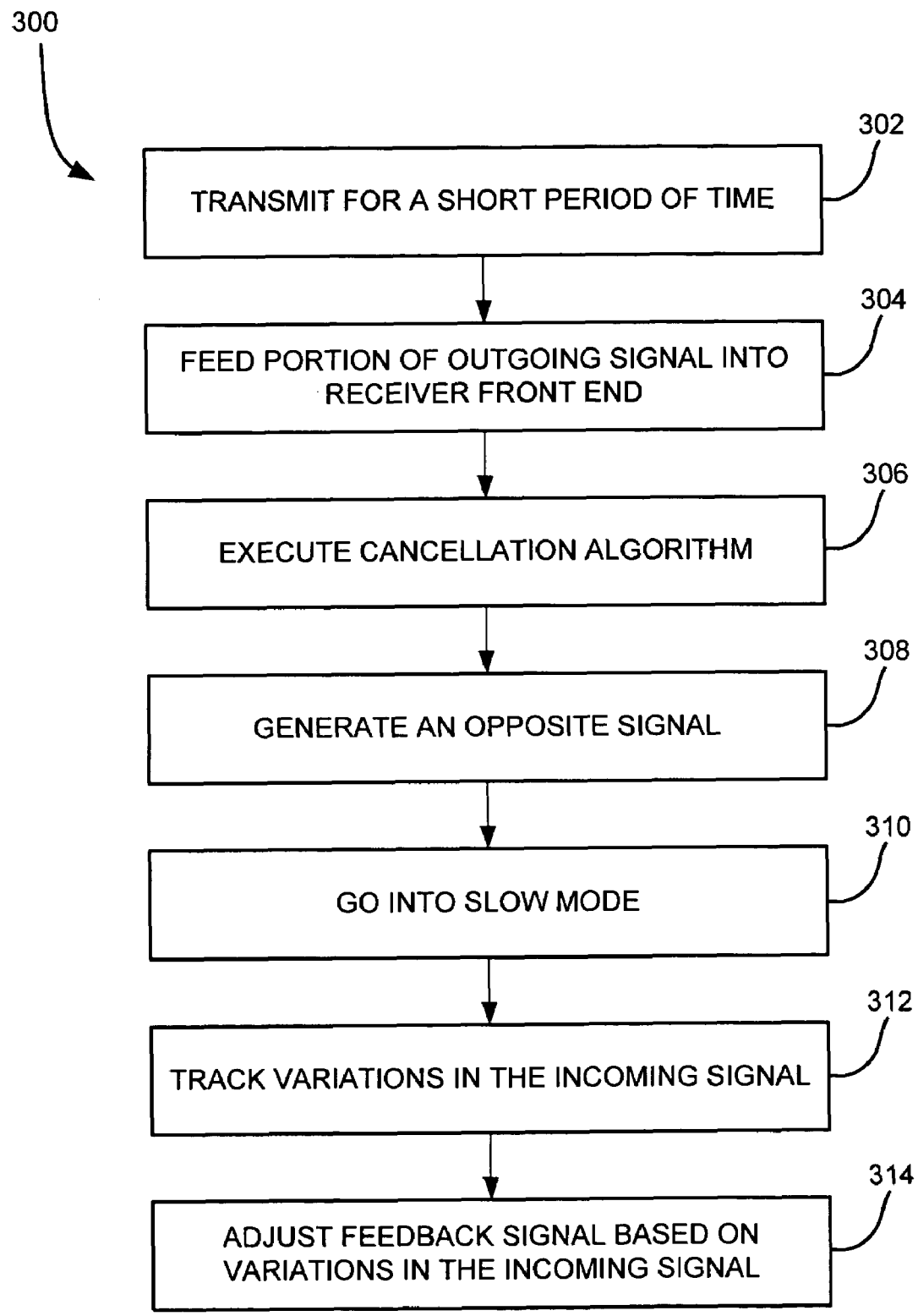
FIG. 3 is a flow diagram of a process for canceling carrier content from an incoming signal.

FIG. 3 illustrates a process 300 for canceling the carrier content (carrier signal and phase noise) from the incoming signal. When the system is first engaged or when the main frequency is changed, the transmitter starts transmitting for a short time (e.g., 2 ms) in operation 302 to set a first speed in the loop created by the upper directional coupler 222, processor 217 and vector multiplier 214. Also, a small portion of the transmitted (outgoing) carrier signal can be fed back into the receiver front end in operation 304.

The first speed is used when power is first applied or the reader hops frequencies. Because the system is not attempting to communicate with a tag yet, the system attempts to match the speed as closely as possible to that which will provide cancellation of reflected carrier signal noise (carrier content). In this way, the system can ramp up the cancellation feature very quickly prior to slowing into a steady state mode. Preferably, the circuit cancels everything coming back during this period. Whatever carrier content is leaking back is checked and the amount of feedback is set to about the opposite of the received carrier content, thereby canceling it. Preferably, a cancellation algorithm is executed by a processor in operation 306, and the resulting calculations are used to generate an opposite analog feedback signal in operation 308 which can be fed back into the signal input line at the upper directional coupler 222, thereby canceling a majority of the incoming carrier content from the incoming signal. While one skilled in the art will appreciate that the point of input of the feedback signal can vary, the feedback signal is preferably added prior to the amplification stage 224, automatic gain control stage 230, and downconversion stage 232 in the processing pipeline.

Then when the device is ready to start communication with tags, the loop will go to slow mode in operation 310, and will track the varying carrier content in operation 312. In operation 314, the feedback signal is adjusted based on the variations in the residual carrier content signal to continuously cancel the carrier content.

Any changes in the feedback speed are preferably done very slowly so as not to interfere with the tag return signal. However, integration time should not be excessively long, because the variations in the carrier coming in must be detected. For example, if a moving truck is in the environment or if the reader is mounted on a moving platform, the reflected signal will have a Doppler frequency shift characteristic, which translates into continuous phase shift in time. The system detects this and adjusts the timing and/or speed to compensate for the varying return signal.

The fact that the transmitter modulates during sending has little adverse effect, because the system preferably does not analyze the signal during that period of modulation. In other words, the feedback loop is suspended or frozen during periods of modulation of the outgoing carrier signal. And because the period of modulation is much shorter than the time constant of the loop, the cancellation will continue as soon as the modulation ceases.

The cancellation according to the foregoing has the following effects:

1—It will greatly reduce the peak signal level at the receiver front end, since most of the energy coming from the antenna is reflections from the environment and leakage from the transmission path. The reduction will reduce the interference generated by inter-modulation products falling into the receiver pass-band.

2—Since the cancellation is performed using a feedback signal which is based on, and identical or nearly identical to, the transmitted signal, the phase noise of the transmitted signal will also be cancelled out. The feedback signal can be an analog fraction (e.g., $\leq 1\%$) of the outgoing carrier signal itself.

3—The cancellation will improve the dynamic range of the receiver I-Q mixers and digital to analog converter (DAC) used to sample the received signal, by removing the contents with only the part of the signal containing information. This increase of dynamic range may allow adding an automatic gain control (AGC) stage 230 after the low noise amplifier (LNA) stage 224.

With continued reference to FIG. 2, portions of the device performing the cancellation include:

1—Cancellation algorithm 216: It will average I and Q data over a specified period and determine the content of the coherent carrier in the received signal. The cancellation algorithm preferably performs the following:

a—Integrating the I and Q data to extract the DC (i.e. carrier) contents over variable durations. The integration will be short at the initial duration of carrier transmission and long during steady state operation.

b—Run the optimization algorithm to determine the direction of the variation of the (I+jQ) vector.

c—Determine the update value for the I and Q DACs.

d—Drive I and Q DACs to control the vector multiplier.

2—Cancellation output I and Q DACs 218,220: These are driven by the algorithm to control the Vector multiplier I and Q coefficients.

3—Directional Coupler 1 212 routes a small portion of the transmitted carrier to the vector multiplier. The portion will be representative to the original carrier with the phase noise contents.

4—Vector Multiplier 214: The input to this device is the portion of the transmitted carrier routed through the directional coupler 1 (Cin). The output (Cout) preferably has the amplitude and phase described by:

$Cout = A*Cin*(I+jQ)$

Where Cout, A, Cin are complex,
A=amplitude,
I and Q are real, and $j=\sqrt{-1}$ 5—Directional Coupler 2 222: This coupler will inject the output from the vector multiplier into the receive path either before the LNA or before the second stage of LNA 224. At steady state, and because of the operation of this feedback loop, the output will have the majority of the unmodulated received carrier cancelled out.

One skilled in the art will understand that many of these components may be merely coupled to the circuit or excluded altogether in some applications, and do not necessarily need to form a portion of a unitary circuit.

One main advantage is that this system allows the designer to increase the low noise amplifier gain, so that an improvement in the overall noise figure is obtained. Current systems do not allow such an increase, as the signal coming in is saturated with carrier.

Improved sensitivity because, since getting rid of the carrier itself, which is the strongest signal, the reader can use a much more sensitive preamp with more gain, which means a better noise figure. A gain of 10 to 1 is readily obtainable.

An additional benefit is that because the carrier is being fed back, phase noise is fed back as well. So when the carrier is cancelled, so is the phase noise. Thus, the system provides coherent carrier cancellation.

Yet another advantage is that the dynamic range is greatly increased because the system is dealing with pure signal from the tag without the adverse effect of noise.

Figure 4:
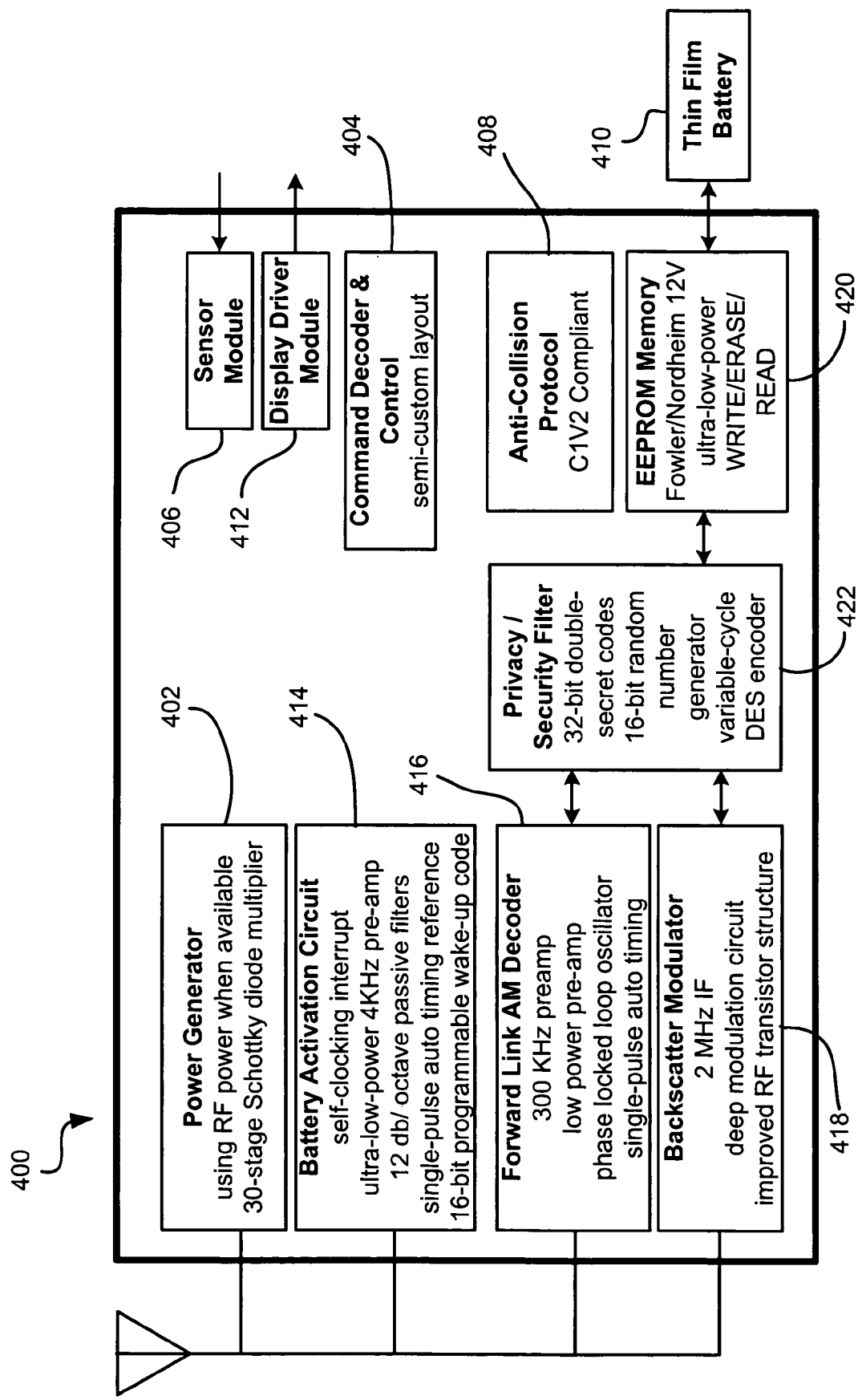
FIG. 4 is a system diagram for an integrated circuit (IC) chip for implementation in an RFID tag.

The present invention is preferably implemented in a system for communicating with a Class-3 or higher Class tag, but will function with any type of module or class of RFID tag. FIG. 4 depicts a circuit layout of a Class-3 module 400 according to a preferred embodiment for implementation in an RFID tag, and is presented by way of example only. This Class-3 module can form the core of RFID modules appropriate for many applications such as identification of pallets, cartons, containers, vehicles, or anything where a range of more than 3 meters is desired. As shown, the module 400 includes several industry-standard circuits including a power generation and regulation circuit 402, a digital command decoder and control circuit 404, a sensor interface module 406, a C1V2 interface protocol circuit 408, and a power source (battery) 410. A display driver module 412 can be added to drive a display.

A battery activation circuit 414 is also present to act as a wake-up trigger. The battery activation circuit 414 includes with an ultra-low-power, narrow-bandwidth preamplifier. The battery activation circuit 414 also includes a self-clocking interrupt circuit and may use an innovative 32-bit user-programmable digital wake-up code as described in U.S. patent application entitled "BATTERY ACTIVATION CIR- CUIT" and having Ser. No. 11/007,973, filed on Dec. 8, 2004, and which is herein incorporated by reference. The battery activation circuit 414 draws less power during its sleeping state and is much better protected against both accidental and malicious false wake-up trigger events that otherwise would lead to pre-mature exhaustion of the Class-3 tag battery 410.

A forward link AM decoder 416 uses a simplified phase-lock-loop oscillator that requires an absolute minimum amount of chip area. Preferably, the circuit 416 requires only a minimum string of reference pulses.

A backscatter modulator block 418 preferably increases the backscatter modulation depth to more than 50%.

A pure, Fowler-Nordheim direct-tunneling-through-oxide mechanism 420 is present to reduce both the WRITE and ERASE currents to less than 0.1 µA/cell in the EEPROM memory array. This will permit designing of tags to operate at maximum range even when WRITE and ERASE operations are being performed.

The module 400 also incorporates a highly-simplified, yet very effective, security encryption circuit 422 as described in U.S. patent application entitled "SECURITY SYSTEM AND METHOD" and having Ser. No. 10/902,683, filed on Jul. 28, 2004 and which is herein incorporated by reference.

Sensors to monitor temperature, shock, tampering, etc. can be added by appending an industry-standard I2C interface to the core chip.

Extremely low-cost Class-2 security devices can be built by simply disabling or removing the wake-up module, pre-amplifiers, and IF modules from the Class-3 module core.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for adaptive cancellation of carrier content, comprising:
   receiving a signal:
   adaptively detecting an amount of carrier content in the received signal;
   generating a feedback signal for canceling out the carrier content in the incoming signal; and
   introducing the feedback signal for canceling out a majority of carrier content in the signal being received,
   wherein the feedback signal is not added to the signal being received during modulation by a transmitter generating a carrier signal.

2. The method of claim 1, wherein the carrier content includes a reader carrier signal and phase noise associated with the reader carrier signal.

3. The method of claim 1, wherein the feedback signal is derived in part from an outgoing carrier signal.

4. The method of claim 1, wherein detecting an amount of carrier content in the received signal includes performing 1-Q detection on the received signal.

5. The method of claim 1, wherein the method is performed by a radio frequency identification (RFID) reader.

6. The method of claim 1, wherein the feedback signal is an analog signal.

7. The method of claim 1, wherein the feedback signal is an analog fraction of an outgoing carrier signal.

8. The method of claim 1, wherein the signal being received is amplified by an amplifier, wherein the feedback signal is introduced to the signal being received at a point prior to the amplifier.

9. The method of claim 1, wherein automatic gain control is performed on the signal being received, wherein the feedback signal is introduced to the signal being received prior to performing automatic gain control thereon.

10. The method of claim 1, wherein downconversion is performed on the signal being received, wherein the feedback signal is introduced to the signal being received prior to performing downconversion thereon.

11. A system for adaptive cancellation of carrier content, comprising:
    an antenna for receiving a signal;
    a mechanism for adaptively detecting the amplitude of the carrier content in the received signal;
    a mechanism for generating a feedback signal for canceling carrier content from the signal being received, the feedback signal being generated based at least in part on the detected amplitude of the carrier content in the received signal; and
    at least one of an amplifier and a filter operating on the signal prior to addition of the feedback signal to the signal,
    wherein the system is embodied in a radio frequency identification (RFID) reader, the RFID reader further comprising a transmitter for generating an outgoing signal, wherein the feedback signal is not added to the signal being received during modulation by the transmitter.

12. The system of claim 11, wherein the vector multiplier also receives a portion of an outgoing carrier signal, wherein the feedback signal is generated based at least in part on the portion of the outgoing carrier signal.

13. The system of claim 11, wherein the carrier content includes a reader carrier signal and phase noise associated with the reader carrier signal.

14. The system of claim 11, wherein the phase of the carrier content is also detected, wherein the feedback signal is generated based at least in part on the phase of the carrier content.

15. The system of claim 11, wherein the mechanism for adaptively detecting the amplitude of the carrier content includes a processor running a cancellation algorithm.

16. The system of claim 11, wherein the mechanism for generating the feedback signal includes a vector multiplier.

17. The system of claim 11, wherein the mechanism for adaptively detecting the ampliwde of the carrier content and the mechanism for generating the feedback signal form part of a closed loop.

18. The system of claim 11, wherein the feedback signal is an analog signal.

19. The system of claim 11, wherein the feedback signal is combined with the signal being received.

20. The system of claim 11, further comprising an analog device for combining the feedback signal with the signal being received.

21. The system of claim 11, further comprising an automatic gain control stage located after a point where the analog mechanism operates on the incoming signal.

* * * * *